United States Patent [19]
Le Salver et al.

[11] 3,970,162
[45] July 20, 1976

[54] DEVICE FOR SUSPENDING THE BODY AND THE ENGINE-DRIVE UNIT IN AN AUTOMOBILE VEHICLE

[75] Inventors: Robert Le Salver, Chanteloup les Vignes; Dominique Poupard, Courbevoie, both of France

[73] Assignees: Automobiles Peugeot, Paris; Regie Nationale des Usines Renault, Boulogne-Billancourt, both of France

[22] Filed: Mar. 14, 1975

[21] Appl. No.: 558,358

[30] Foreign Application Priority Data
Mar. 28, 1974 France .............................. 74.10934

[52] U.S. Cl. .................... 180/64 R; 248/8; 280/715
[51] Int. Cl.[2] .................... B60G 13/00; B60K 5/00
[58] Field of Search .............. 180/64 R; 280/124 A, 280/106.5 R; 267/33, 35; 248/8, 9, 10

[56] References Cited
UNITED STATES PATENTS

| | | |
|---|---|---|
| 1,995,031 | 3/1935 | Lee .................................. 180/64 R |
| 3,024,041 | 3/1962 | Maruhn ........................ 280/106.5 R |
| 3,155,382 | 11/1964 | Shakespear ...................... 280/124 A |
| 3,165,161 | 1/1965 | Nallinger ........................... 180/64 R |
| 3,202,237 | 8/1965 | Dreiszinger ..................... 280/124 A |
| 3,209,851 | 10/1965 | Collins .............................. 180/64 R |
| 3,395,769 | 8/1968 | Julien ................................ 180/64 R |

*Primary Examiner*—M. H. Wood, Jr.
*Assistant Examiner*—David M. Mitchell
*Attorney, Agent, or Firm*—Burns, Doane, Swecker & Mathis

[57] ABSTRACT

Two series of separate elastically yieldable blocks having different stiffnesses are disposed between the damper and the vehicle body and between the damper and the engine-drive unit.

The accelerations transmitted to the body and to the engine are then substantially equal. In this way, the relative movements between the engine-drive unit and the body and the resulting vibrations are reduced while the noises transmitted by the engine through its suspension are also reduced.

9 Claims, 4 Drawing Figures

DEVICE FOR SUSPENDING THE BODY AND THE ENGINE-DRIVE UNIT IN AN AUTOMOBILE VEHICLE

The present invention relates to elastically yieldable suspension devices for supporting the body and the engine-drive unit in an automobile vehicle.

It is known that it is impossible to attain an absolutely perfect dynamic balancing of a heat engine and that consequently it is desirable to support the engine-drive unit by elastically yieldable blocks which have as low a stiffness as possible in order to transmit the minimum of vibratory forces to the body of the vehicle. Now, due to the unevenness of the road along which the vehicle travels, the vehicle wheels transmit to the body, through the shock-absorbing support devices, forces which cause relative displacements between the engine and the body which are the larger as the engine suspension blocks are more flexible. These relative displacements result in a considerably diminished comfort under the effect of the vibrations or shaking produced.

An object of the present invention is to overcome this drawback and to permit the use of flexible blocks for supporting the engine in order to afford a good filtering of the vibrations and of the rumbling noise due to the imperfect balancing of the engine while eliminating the vibrations due to relative movements between the engine and the body under the effect of the unevenness of the road.

The invention is applicable to vehicle suspensions comprising a damper or shock absorber connected by its upper part to the body through a first elastically yieldable block.

The suspension device according to the invention is such that the upper part of the damper is also connected to the engine-drive unit by a second elastically yieldable block.

In this way, under the effect of the vertical displacements of the wheel due to the unevenness of the road, the damper transmits both to the body and to the engine accelerations in the same direction. The result is that the movements of the engine with respect to the body are considerably reduced.

Preferably and according to another feature of the invention, the ratio of the stiffnesses of the first block to that of the second block is roughly equal to the ratio between the mass impedances of the body and of the engine unit or engine-drive unit, calculated respectively in the vertical directions corresponding to the intersection of the plane of symmetry of the vehicle and a transverse vertical plane through roughly the point of attachment of the damper to the considered mass.

Under these conditions, the body and the engine undergo equal accelerations on the part of the damper so that the movement of the engine with respect to the body is practically zero.

Further features of the invention will be apparent from the ensuing description with reference to the accompanying drawings given solely by way of example and in which:

FIG. 1 shows the front part of a vehicle which includes an engine-drive unit 1 which is arranged transversely of the vehicle between the front wheels 2.

Figure 1:
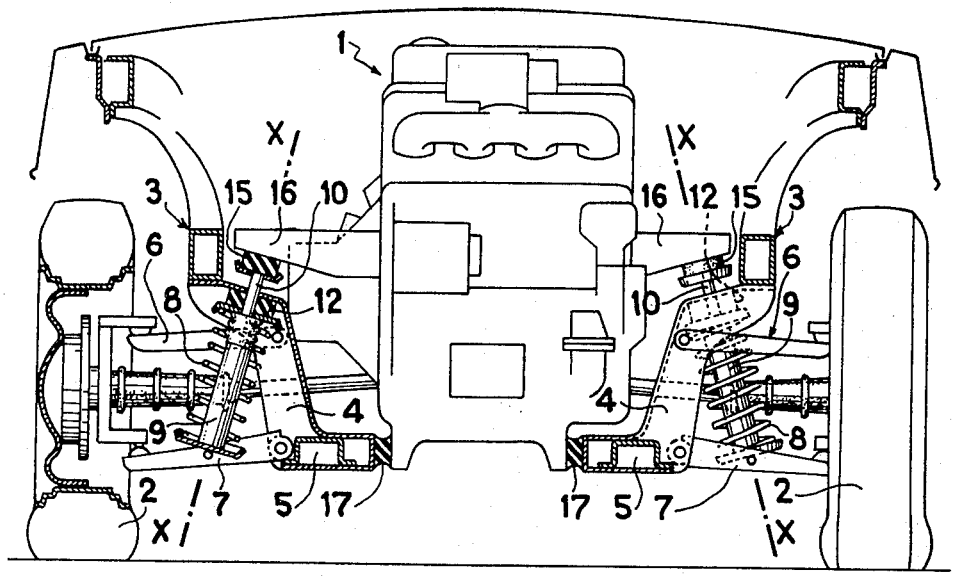
FIG. 1 is a diagrammatic front elevational view, partly in section, of a suspension according to the invention.

The structure or frame of the vehicle integral with the body is shown in particular by the longitudinal members 3 which are connected by cross-members 4 to a cradle 5. The wheels are connected to the structure by a resiliently yieldable suspension comprising, on one hand, upper arms or triangles 6 and lower arms or triangles 7 which are pivoted to the cross-members 4 and, on the other hand, springs 8 and telescopic dampers or shock absorbers 9.

Figure 2:
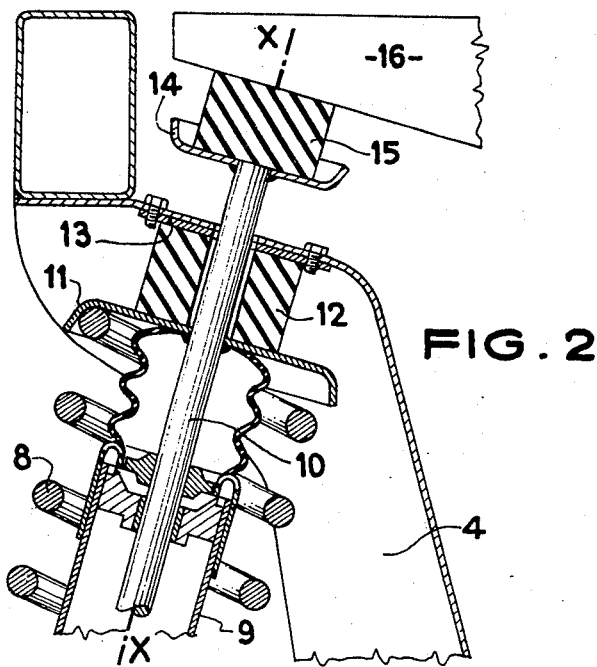
FIG. 2 is a sectional view to an enlarged scale of a detail shown in FIG. 1, and FIGS. 3 and 4 are views identical to FIG. 2 in respect of modifications of the invention.

The connection between the upper part of the damper and the body is shown in more detail in FIG. 2. Fixed to the rod 10 of the damper is a cup 11 which acts as an upper support for the spring 8. The cup 11 moreover constitutes the lower armature of an elastically yieldable block 12 whose upper armature 13 is fixed to the cross-member 4. The rod 10 of the damper is extended beyond the block 12 and the cross-member 4 and terminates in a cup 14 which is connected by an elastically yieldable block 15 to an arm 16 integral with the engine-drive unit 1.

The static load of the engine-drive unit 1 and the forces due to the torque are preferably supported exteriorly of the blocks 15 by any known means, for example by elastically yieldable blocks 17 connected to the cradle 5 and by other blocks (not shown).

Preferably the ratio between the stiffness of the elastically yieldable block 12 and the stiffness of the elastically yieldable block 15 is roughly equal to the ratio between the mechanical impedance of the body and the mechanical impedance of the engine unit respectively calculated in vertical directions corresponding to the intersection of the plane of symmetry of the vehicle and the transverse vertical plane through the points of attachment of the damper to the considered mass. As is known, the mechanical impedance at a given point of a body is the ratio F/γ in which γ designates the acceleration of the point of the structure when a sinusoidal force of amplitude F is exerted thereon.

The mechanical impedance of a body in a given direction included in one of its planes of symmetry is given by the equation:

$$I_m = M \frac{I}{I + ML^2}$$

in which:
- $I_m$ is the mechanical impedance,
- M is the total mass of the body,
- I is its moment of inertia with respect to a straight line perpendicular to the plane of symmetry of the body passing through its centre of gravity,
- L is the distance between the given direction and the centre of gravity.

In most cases, the ratio between the stiffness of the block associated with the body and that of the block associated with the engine-drive unit is between 1.5 and 4, which ratio is roughly equal to 2.5 which is suitable for example for a vehicle of small or medium size, such as that shown in the drawings.

With the arrangement just described, it can be seen that any impulse on the rod 10 of the damper is simultaneously transmitted to the body and the engine-drive unit through respectively the blocks 12 and 15. Owing to the particular ratio between the stiffnesses of these blocks, the body and the engine-drive unit undergo accelerations which are practically equal and there is no relative displacement therebetween.

There can then be adopted for the blocks which support the static load of the engine very high elasticity which permits a good filtration of the vibrations between the engine and the body with no notable movements on the road resulting therefrom.

Figure 3:
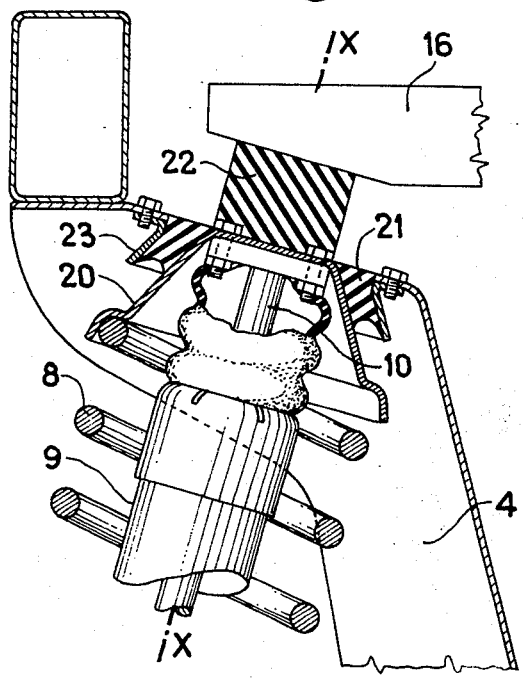

In the embodiment shown in FIG. 3, the rod 10 of the damper or shock absorber is fixed to a cup 20 which acts as an armature common to two elastically yieldable blocks 21, 22. This cup 20 also acts as an upper support for the spring 8. The block 22, like the block 15 of the first embodiment, is connected to the arm 16 of the engine-drive unit. The block 21 comprises a second armature 23 fixed to the cross-member 4.

This arrangement gives the same result as the first arrangement and affords the further advantage of a much shorter rod 10 of the damper.

Figure 4:
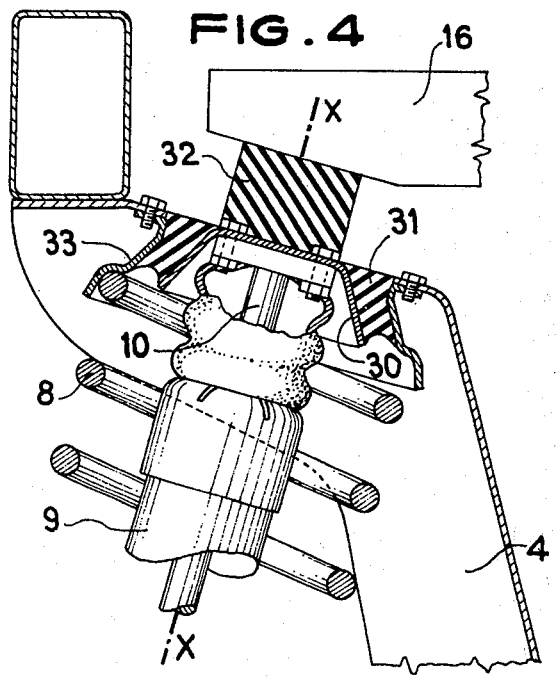

The embodiment shown in FIG. 4 differs from the preceding embodiment only by the fact that the spring 8 bears against the second armature 33 of the block 31 instead of the cap 30. The block 32 is identical to the block 22.

This arrangement still gives the same results but it has the advantage of considerably reducing the static load on the block 31 which greatly improves its performance.

It will be observed that the invention is applicable if the damper 9 is disposed in such manner that its rod is located in its lower part, or if the spring 8 is not disposed around the damper but to one side thereof.

Having now described our invention, what we claim as new and desire to secure by Letters Patent is:

1. An elastically yieldable suspension device comprising a body of an automobile vehicle, a unit comprising an engine-drive assembly or engine of the automobile vehicle, a wheel assembly of the vehicle, a suspension member connecting the wheel assembly to the body, a damper having a lower part bearing against the suspension member and an upper part, the upper part and lower part being relatively movable in operation of the damper, a first elastically yieldable block elastically connecting said upper part to the body, and a second elastically yieldable block elastically connecting the upper part of the damper to said unit to support said unit.

2. A suspension device as claimed in claim 1, wherein said blocks have different stiffnesses.

3. A suspension device as claimed in claim 2, wherein the ratio between the stiffnesses of the first and second blocks is substantially equal to the ratio between the mechanical impedances of the body and of said unit calculated respectively in vertical directions corresponding to the intersection of a plane of symmetry of the vehicle and a transverse vertical plane passing through points of the connection of said damper parts to the body and said unit.

4. A suspension device as claimed in claim 2, wherein the stiffness of the first block is 1.5 to 4 times that of the stiffness of the second block.

5. A suspension device as claimed in claim 1, comprising a cup integral with said upper part of the damper, the first block being interposed between and interconnecting the body and the cup.

6. A suspension device as claimed in claim 5, comprising a coil spring coaxial with the damper and having an end in bearing relation to and supported by said cup.

7. A suspension device as claimed in claim 5, wherein said upper part of the damper comprises a rod having an upper end and said cup and the first block are traversed by the rod which is integral with the cup, a second cup bearing against the second block and acting as a support for the second block being carried at the upper end of the rod.

8. A suspension device as claimed in claim 5, wherein said cup bears against the second block.

9. A suspension device as claimed in claim 5, comprising a second cup integral with the body, the first block being placed between the second cup and the first cup, and a coil spring coaxial with the damper and having an end in bearing relation to the second cup.

* * * * *